United States Patent
Yamamoto et al.

(10) Patent No.: US 7,690,019 B2
(45) Date of Patent: Mar. 30, 2010

(54) RECEIVING APPARATUS AND RECEIVING METHOD

(75) Inventors: Takashi Yamamoto, Kanagawa (JP); Atsushi Mizutome, Kanagawa (JP); Teruki Kikkawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1231 days.

(21) Appl. No.: 10/667,315

(22) Filed: Sep. 23, 2003

(65) Prior Publication Data

US 2004/0068745 A1 Apr. 8, 2004

(30) Foreign Application Priority Data

Oct. 8, 2002 (JP) ............... 2002-294744

(51) Int. Cl.
*H04N 7/173* (2006.01)

(52) U.S. Cl. ............... 725/87; 725/97; 725/38

(58) Field of Classification Search ............ None
See application file for complete search history.

(56) References Cited

U.S. PATENT DOCUMENTS

| | | | |
|---|---|---|---|
| 5,908,467 A | 6/1999 | Barrett | |
| 6,032,189 A | 2/2000 | Jinzenji et al. | 709/235 |
| 6,337,715 B1 | 1/2002 | Inagaki et al. | |
| 6,401,243 B1 | 6/2002 | Suzuki | |
| 6,965,604 B1 | 11/2005 | Sato et al. | |
| 7,043,548 B2 | 5/2006 | Bouet | |
| 2002/0065910 A1 | 5/2002 | Dutta | |
| 2002/0067318 A1 | 6/2002 | Matsuzaki et al. | 345/1.1 |
| 2002/0128029 A1 | 9/2002 | Nishikawa et al. | |
| 2003/0002862 A1* | 1/2003 | Rodriguez et al. | 386/125 |
| 2003/0009587 A1* | 1/2003 | Harrow et al. | 709/238 |
| 2004/0083301 A1* | 4/2004 | Murase et al. | 709/231 |
| 2008/0077960 A1* | 3/2008 | Griggs | 725/46 |

FOREIGN PATENT DOCUMENTS

| | | |
|---|---|---|
| EP | 1096749 | 2/2001 |
| JP | 11-32271 | 2/1999 |
| JP | 11-234581 | 8/1999 |
| JP | 11-275477 | 10/1999 |
| JP | 2001127790 | 5/2001 |
| JP | 2001-309258 | 11/2001 |
| JP | 2002281081 | 9/2002 |
| WO | 01/33783 | 5/2001 |
| WO | WO 02/23908 | 3/2002 |

OTHER PUBLICATIONS

European Search Report dated Feb. 21, 2008 issued during prosecution of related European application No. 03022459.6.

* cited by examiner

*Primary Examiner*—John W Miller
*Assistant Examiner*—Omar Parra
(74) *Attorney, Agent, or Firm*—Fitzpatrick, Cella, Harper & Scinto

(57) ABSTRACT

In order to make it possible to easily judge a time until a program can be actually audio visually enjoyed after the program is selected, a receiving apparatus includes a controller which receives plural contents such as plural streaming broadcasts via a network, outputs video data of the contents to a display apparatus, estimates a time until each of the plural broadcast contents becomes audio visually enjoyable, and displays information on the estimated time on the display apparatus in association with program names of the plural contents data.

10 Claims, 10 Drawing Sheets

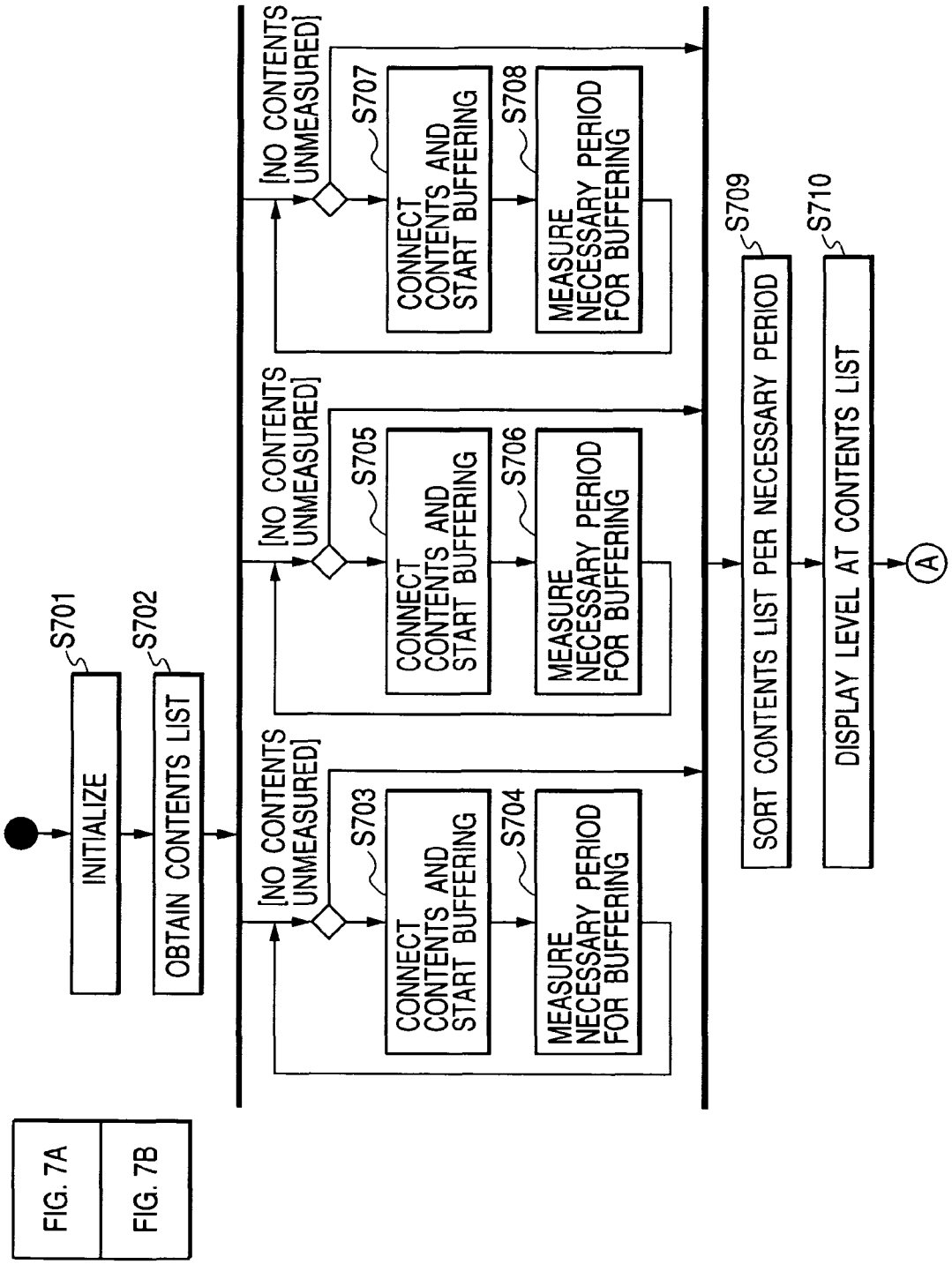
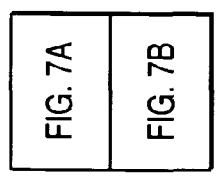
FIG. 7A

RECEIVING APPARATUS AND RECEIVING METHOD

BACKGROUND OF THE INVENTION

1. Field of the Invention

The present invention relates to a receiving apparatus, and in particular to an apparatus and a method for receiving contents data which is distributed via a network.

2. Related Background Art

It is becoming possible to supply contents including audio and video via the Internet as a program, which have been supplied by means of ground waves, satellite waves, or cables.

In the conventional broadcast using radio waves or through cables, it is possible for a user to audio visually enjoy a program immediately when the user satisfies conditions necessary for reception and selects a broadcast in a receiver. A transmission quality is hardly affected by an increase or decrease of users, who are simultaneously audio visually enjoying a program, owing to characteristics of a transmission line.

On the other hand, in the world of the Internet, by connecting a server to the Internet, contents can be supplied to an unspecified member of general public as a program.

In the Internet environment according to a best effort type service, a response speed of a site varies depending upon a constitution of the site or an operating state of the site at every moment. That is, since a site providing a service has to respond to each request for the service individually, it is likely that a response speed for an individual access for contents provided by the site is delayed if a large number of users use the contents simultaneously or other load on the site is large. In some cases, the users may not be able to receive the service itself depending upon a degree of congestion.

In addition, a transfer speed of data for access varies depending upon a state of a network between a contents supply site and a receiver of a user. Moreover, a data path on the network is not always fixed. A transfer path may change to cause a change in a response speed or a transfer speed of contents data.

Examples of a related art include Japanese Patent Application Laid-Open Nos. H11-234581, H11-275477, and 2001-309258.

As described above, in the case in which a service via the Internet is offered, a response speed or a transfer speed of contents to be provided may change. In the case in which a program made of stream data involving video and audio is used as a service, this speed is recognized as a necessary period until the program becomes actually audio visually enjoyable after the program is selected. For example, a necessary period until audio visual enjoying is started changes depending upon a state of a site on a network. An audience does not know the necessary period until the audience selects a program and actually accesses a site of the program. Therefore, under a situation in which sites having various response abilities are mixed and the state changes every moment on the network, the audience is kept waiting, without knowing how long he/she would be actually kept waiting, until reproduction of video and audio is actually started after the audience selects a program. The audience feels uneasiness about waiting for an unpredictable time, which causes significant stress for the audience in using the service.

SUMMARY OF THE INVENTION

It is an object of the present invention to provide, in the system described above for providing a stream contents service in the Internet environment, a receiving apparatus and a receiving method with which a user can easily judge a time until audio visual enjoying actually becomes possible after the user selects contents.

It is another object of the present invention to provide a receiving apparatus and a receiving method which can substantially reduce a necessary period until starting audio visual enjoying and realize an efficient program selection manipulation.

According to a gist of the present invention, there is provided a receiving apparatus including: reception means which receives plural contents data via a network; contents processing means which processes the contents data received by the reception means to generate video data; output means which outputs the video data to a display apparatus; and control means which estimates a time until each of the plural contents data becomes audio visually enjoyable and controls the output means so as to output information on the estimated time in association with the corresponding plural contents data.

DETAILED DESCRIPTION OF THE PREFERRED EMBODIMENTS

First Embodiment

A first embodiment of the present invention will be hereinafter described with reference to the accompanying drawings.

Figure 1:
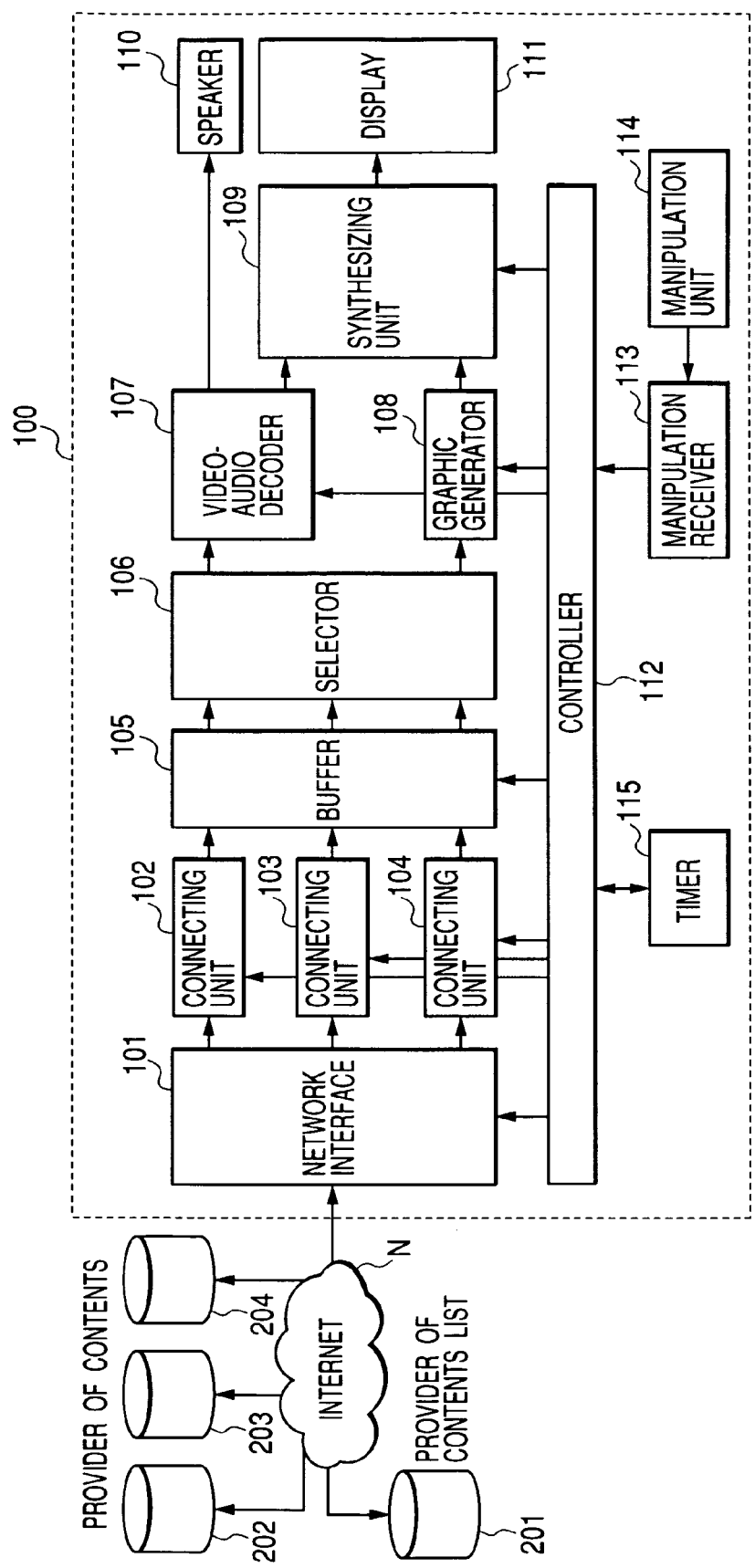
FIG. 1 is a diagram showing a structure of a stream television audio visual system in a first embodiment of the present invention.

FIG. 1 is a diagram showing a structure of a streaming television audio visual system to which this embodiment is applied. In the figure, reference numeral 100 denotes a streaming television receiver; 101, a network interface which is connected to a network such as the Internet, receives web data and streaming data, and sends and receives control data; 102, 103, and 104, connecting units for logically establishing connection to a specific site on the network, respectively, and sending and receiving the various data; 105, a data buffer for temporarily storing the various data obtained through the connecting units 102, 103, and 104; 106, a selector which selects an output through one of the connecting units 102, 103, and 104 out of outputs of the data buffer 105, and outputs reception data to a video-audio decoder 107 or a graphic generator 108; 107, the video-audio decoder which analyzes streaming data outputted from the data buffer and decodes video data and audio data, if necessary; 108, the graphic generator which generates graphical data to be presented to a user based upon the data outputted from the data buffer 105 or control of a controller 112; 109, a video synthesizing unit which synthesizes an output of the video-audio decoder 107 and an output of the graphic generator 108; 110, a speaker which outputs the output of the video-audio decoder 107 as audio; 111, a display which displays an output of the video synthesizing unit 109; 114, a manipulation unit which applies remote manipulation by the user to the streaming television receiver 100; 113, a manipulation receiver which receives a signal of the manipulation unit 114 and notifies the controller 112 of a user manipulation; and 112, the controller which collectively controls the streaming television receiver 100.

In addition, reference numeral 201 denotes a provider of contents list which is connected to a network such as the Internet and performs a service for providing a contents list, which is information concerning introduction of an audio visual program and a connection destination, to the streaming television receiver 100; and 202, 203, and 204, providers of contents which perform a service for providing an audio visual program as contents, respectively.

In this embodiment, the streaming television receiver 100 receives at least two kinds of data. In the case in which the streaming television receiver 100 receives a contents list supplied by the provider of contents list 201, the controller 112 controls one connecting unit 104 and the network interface 101 and receives contents list data from the provider of contents list 201 through a network such as the Internet N.

The received contents list data is temporarily stored in the buffer 105 and is sent to the controller 112 through the selector 106. The controller 112 analyzes the contents list data, generates a contents list to be presented to a user through the graphic generator 108, and displays the contents list through the synthesizing unit 109. The user is capable of performing manipulation on a display through the manipulation unit 114, which is a so-called remote controller, to designate desired contents.

In addition, in the case in which the streaming television receiver 100 receives contents data provided by one of the providers of contents 202, 203, and 204, the contents data, which is received by the network interface 101 according to a procedure described later, is temporarily stored in the buffer 105 through one of the connecting units 102, 103, and 104.

The connecting units 102, 103, and 104 can establish connection to different providers of contents independently to simultaneously receive contents data in parallel and store the contents data in the buffer 105. Necessary contents data is selected by the selector 106 according to contents selected by the controller 112, and audio data and video data are decoded by the video-audio decoder 107. The audio data is outputted from the speaker 110, and the video data is synthesized with graphic data by the synthesizing unit 109 to be displayed on the display 111. The user can audio visually enjoy the data as a program.

Figure 2:
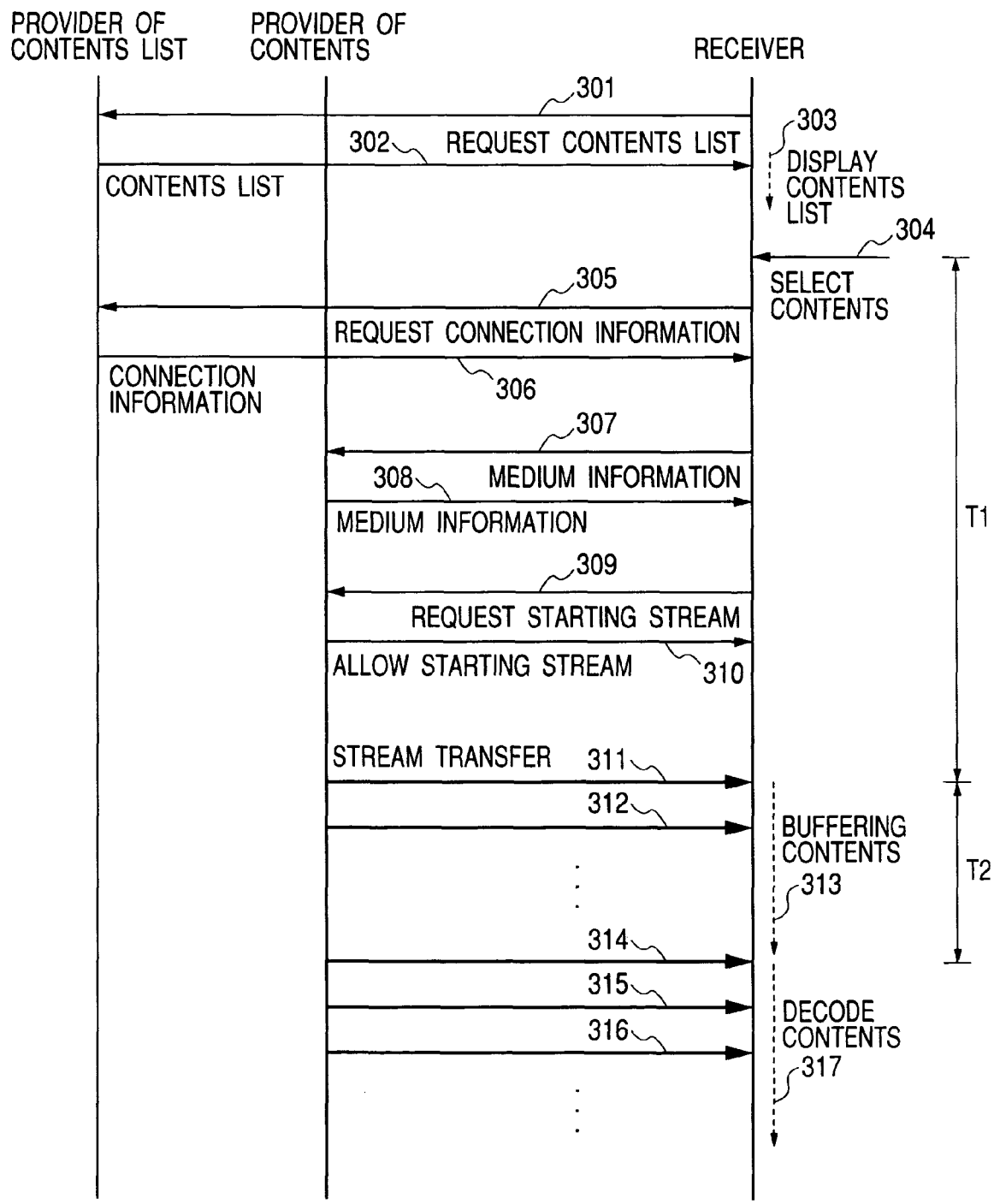
FIG. 2 is a diagram showing a procedure for starting audio visual enjoying of a streaming program.

FIG. 2 is a diagram illustrating procedures of the provider of contents list 201 and the providers of contents 202 to 204 and an operation of the streaming television receiver 100 at the time when a user audio visually enjoys one program. In FIG. 2, arrows in the left and right directions indicate flows on a network, and the procedures progress from the top to the bottom of the figure.

First, the streaming television receiver 100 requests a contents list, which is information concerning a program which a user can audio visually enjoy, from the provider of contents list 201 (301 in FIG. 2). In response to this, the provider of contents list 201 sends contents list data (302). The contents list is information on a connection destination for introducing streaming programs, which are provided by various providers of contents, to users who audio visually enjoy the program through the streaming television receiver 100. At least a title for specifying a program and a URL from which connection destination information is acquired are included in the contents list for each program. In addition, text or graphical data introducing descriptions and performers of the program may be included. The streaming television receiver 100 having received the contents list data analyzes the data in the controller 112 and displays the contents list on the display 111 through the graphic generator 108 (303).

The user being an audience selects a program to audio visually enjoy, from the contents list displayed on the display 111 and instructs the streaming television receiver 100 to show the program with a remote controller (304). The streaming television receiver 100 refers to contents list data for the selected program (contents), and requests connection information from the connection destination in the connection destination information of the contents first (305). In FIG. 2, a URL indicates a site of the provider of contents list 201, and the provider of contents list 201 sends the connection information in response to the request (306).

The connection information includes at least a type of a decoder to be used for the contents, a protocol for accessing the contents, and information on the connection destination. The streaming television receiver 100 requests media information from the connection destination according to a control protocol designated in the connection information (307). The connection destination corresponds to the providers of contents 202 to 204 which supply contents data of the program. Medium information to be sent as a response is information on streaming for the contents, which includes a transfer protocol of the contents data, ports to be used in a server and a receiver, and the like.

After performing setting for the decoder 107 and the connecting unit (assumed to be 102 here) in accordance with the medium information and completing preparation for receiving contents data, the streaming television receiver 100 requests the provider of contents 202 to start data transfer (309). Following a start response (310), contents data transfer from the provider of contents 202 is started (311). The streaming television receiver 100 stores this data in the data buffer 105 through the network interface 101 and the connecting unit 102 (313).

When an amount of data stored in the data buffer 105 has exceeded an amount necessary for absorbing fluctuation of a transfer speed of the network and an amount allowing decode to be started of the decoder 107, necessary data is selected by the selector 106 and supplied to the decoder 107, video data is displayed on the display as described above, or audio data is outputted from the speaker, and audio visual enjoying of program by the user is started (317). As another method, rather than being outputted to the display and/or the speaker, the video data and/or the audio data may be outputted to a video recorder and/or an audio recorder.

Figure 3:
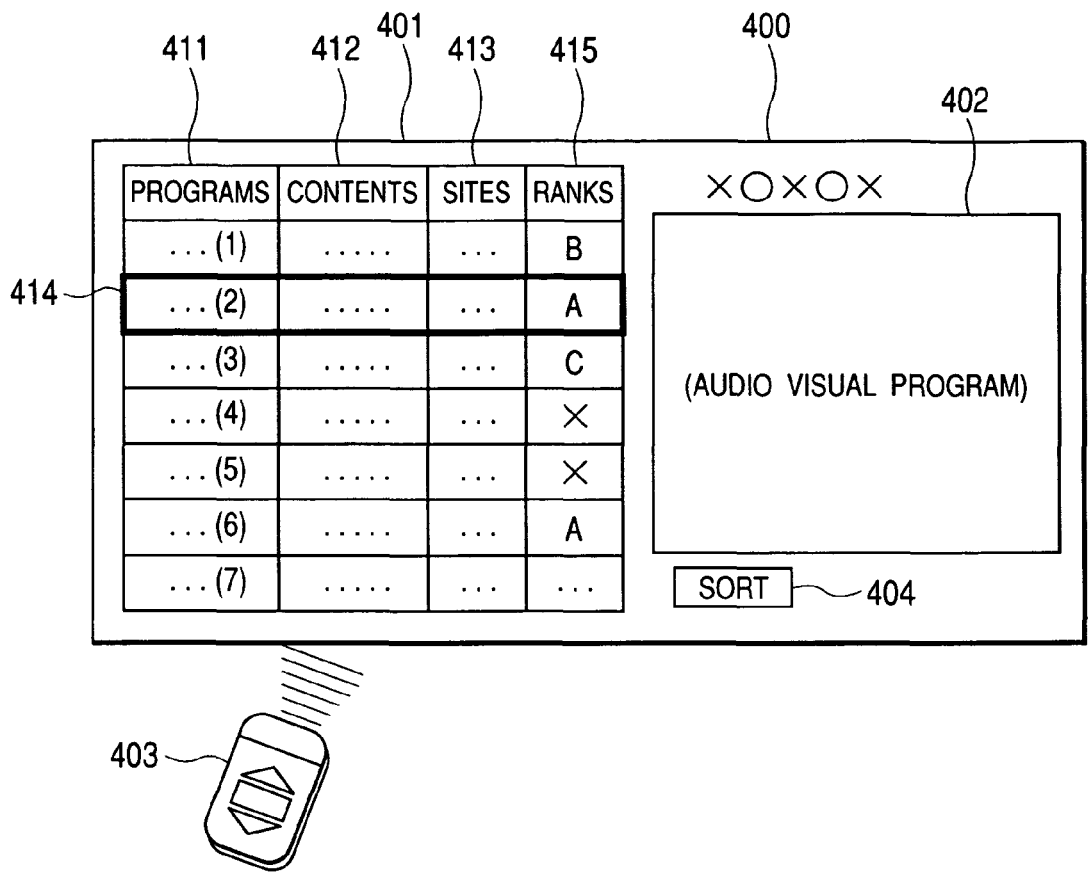
FIG. 3 is a diagram showing a display screen of a streaming television receiver.

FIG. 3 is a diagram showing a display screen of the streaming television receiver 100. Reference numeral 401 denotes a contents list generated by the graphic generator 108 based upon contents list data obtained from the provider of contents list 201. Program names 411 of contents which can be audio visually enjoyed as programs, descriptions 412 which introduce descriptions and performers of the programs, and connection destination sites 413 in audio visual enjoying the programs are displayed in the list.

In addition, an indication of favorite for selection (focus indication) 414 for selecting a program to be audio visually enjoyed is displayed on the contents list by using the remote controller 406 constituting the manipulation unit 114. The user manipulates, for example, direction keys provided in the remote controller 406 to move the focus indication 414 and manipulates a determination key provided in the remote controller 406 in a state in which the focus indication is on a target program, whereby the user can select a program which the user will audio visually enjoy. Consequently, processing for starting audio visual enjoying of the program is started, and decoded video data is synthesized and displayed on an audio visual program display section 402.

Ranks 415 indicating easiness to start audio visual enjoying is displayed at the contents list 401 for each program. It is necessary to access plural sites after the program is selected until audio data is outputted and visual data is displayed to actually start audio visual enjoying as described above.

In the Internet environment according to a best effort type service, response speeds of these sites are different depending upon the site or an operating state of the site. That is, in the case in which utilization of contents provided by the site is high, or in the case in which load other than that of the content imparted by the site is high, it is likely that a response speed for individual access is prolonged, and a user may not be able to receive service depending upon performance of a server or a degree of congestion. In addition, a transfer speed (transfer rate) of data for access is different depending upon a state of a network between a site of a provider of contents and a receiver. Alternatively, a response speed changes according to a change in a data transfer path on the network. Such changes in response speed are perceived as a necessary period from a selection completion time until a time when audio visual enjoying becomes possible (e.g., audio visual enjoying start time) for the user.

In this way, a practical data transfer rate per predetermined time including a response delay or the like can be measured by a controller to estimate a necessary period based upon a result of the measurement.

The ranks (415) of easiness to start audio visual enjoying displayed at the contents list indicate lengths of the necessary period until a time for starting audio visual enjoying as ranks. Here, a rank A indicates a program for which a necessary period until a present time for staring audio visual enjoying is sufficiently short, and audio visual enjoying can be started comfortably. For example, the rank A indicates a state in which comfortable connection is possible even if programs are switched in a sense of channel switching of the conventional television audio visual enjoying.

A rank B indicates a program for which the necessary period until the present time for starting audio visual enjoying is long compared with the rank A. The user is required of a slight waiting time until connection and buffering can be affected after selecting a program.

A rank C indicates a program for which the necessary period until the present time for starting audio visual enjoying is required to some extent. However, the rank C indicates a state in which contents themselves are accessible, and the server of the provider of contents and congestion on the network do not cause a problem in continuous audio visual enjoying of the program.

On the other hand, a rank X indicates a state in which audio visual enjoying of a program is difficult. The state is assumed as a case in which, even if contents are listed in the contents list provided by the provider of contents list 201, provision of the contents is actually stopped, a case in which servers of the providers for contents 202 to 204 have failed and cannot be accessed, or the like. In addition, the state indicated by the rank X also includes a state in which there are a very large number of accesses to the servers of the providers of contents 202 to 204 and the servers cannot respond sufficiently to the accesses for starting audio visual enjoying by users, and a state in which a satisfactory access cannot be made due to congestion or failure on a network N between the streaming television receiver 100 and the sites of the providers of contents 202 to 204.

Moreover, actual audio visual enjoying cannot be started in the case in which, even if control access for starting audio visual enjoying ends and transfer of contents data is started, a transfer speed sufficient for transfer of stream data cannot be secured. That is, in the case in which a rate of increase in a storage capacity in the data buffer 105 is less than a data rate required by the contents data in the contents buffering (313) in FIG. 2, it can be assumed that supply of the contents data does not keep up with audio visual enjoying after decode is started to stop audio visual enjoying. Then, a program is judged as a program which cannot be viewed at present, and the rank X is displayed.

Figure 4:
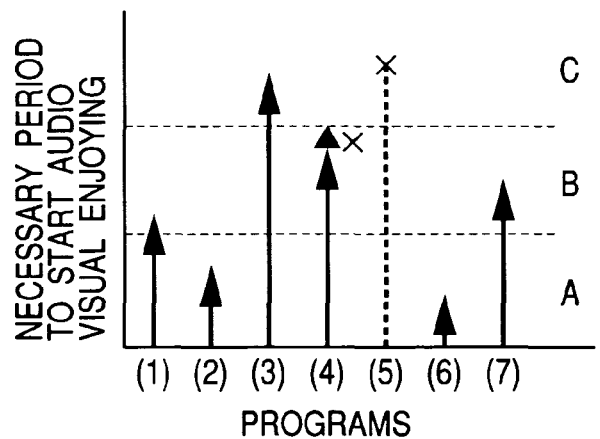
FIG. 4 is a diagram showing a relation between a measured necessary period until start of audio visual enjoying and display according to ranks.

FIG. 4 is a diagram showing a relation between a measured necessary period until start of audio visual enjoying and display according to the ranks. The horizontal axis of the figure indicates programs in accordance with a contents list, and the vertical axis indicates a necessary period from selection of a program until start of audio visual enjoying.

For example, programs (2) and (6) are judged as programs for which audio visual enjoying can be started in a sufficiently short time and are given the rank A. Programs (1) and (7) are judged as programs for which a slight waiting time is required compared with the rank A and are given the rank B. A program (3) is judged as a program for which a waiting time should be expected in order to audio visually enjoy the program and is given the rank C. A program (5) is a program for which a control procedure up to start of audio visual enjoying cannot be finished as a result of an access and which cannot be viewed at present, and is given the rank X.

In addition, a program (4) is judged as a program for which the procedure up to buffering has been finished in a time of the level of the rank B but it is observed, through monitoring of contents data buffering, that a transfer rate has not reached a level necessary for decode of contents data, and it is judged to be highly likely that, even if audio visual enjoying is started, supply of the contents data does not keep up with the audio visual enjoying to thereby stop audio visual enjoying. Thus, the program (4) is given the rank X.

Figure 5:
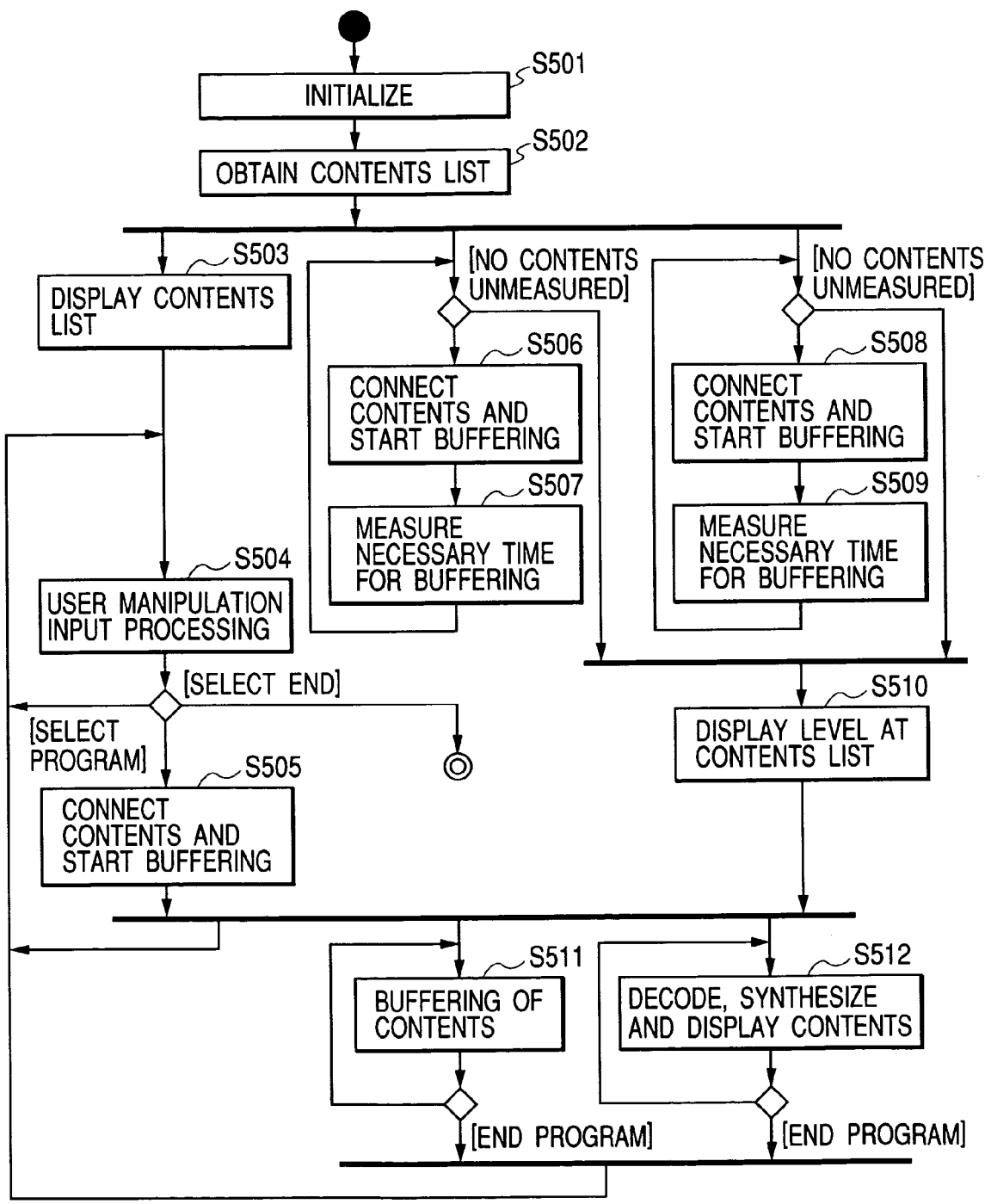
FIG. 5 is a diagram showing control of the streaming television receiver.

FIG. 5 shows a procedure of control in the controller 112 of the streaming television receiver 100 and is an activity diagram showing control in which the streaming television receiver 100 is started up to display the contents list shown in FIG. 3 and a user selects a program to start audio visual enjoying of the program.

Upon being started up, the streaming television receiver 100 performs necessary initialization first (S501), and obtains a contents list from the provider of contents list 201 (S502). This is equivalent to 305 and 306 in the illustration of FIG. 2. Then, the streaming television receiver 100 analyzes the obtained contents list to display the contents list on the display 111 (S503), and controls the focus indication or the like to start reception of manipulation for audio visual enjoying of a program by a user (S504). This is equivalent to 303 and 304 in the illustration of FIG. 2.

In parallel with the above, concerning a program in the contents list, the streaming television receiver 100 measures a necessary period from selection until start of audio visual enjoying of the program, and displays the measured necessary period in the contents list as a rank.

That is, the streaming television receiver 100 selects programs in the contents list one by one, obtains connection information of contents (305 and 306 in FIG. 2), obtains medium information (307 and 308 in FIG. 2), and measures a necessary time T1 of control for this connection in a timer 115 (S506). At this point, in the case in which any of these accesses cannot be performed, the streaming television receiver 100 judges that audio visual enjoying of the program is impossible.

The streaming television receiver 100 requests starting stream based upon the obtained medium information and, thereafter starts reception of a stream to start buffering (S507; equivalent to 309, 310, and 311 in FIG. 2). The streaming television receiver 100 monitors an amount of buffer storage of the contents data in the controller 112, measures a necessary period T2 until the amount of buffer storage reaches a capacity allowing start of decode in the timer 115 (S507), and requests streaming stop of the contents. The streaming television receiver 100 assumes a sum of the measured times T1 and T2 as a necessary period until start of reception, and judges the rank. In addition, the streaming television receiver 100 compares T2 with respect to contents of the received contents data, judges whether or not a sufficient transfer rate is obtained for continuous processing of the contents data in the controller 112, and judges that the level of the program is X if a transfer rate is not sufficient. In the present invention, in a situation in which a difference between the time T1 and the time T2 is large, one of the times T1 and T2, more preferably a longer time may be assumed as a necessary period until audio visual enjoying becomes possible.

The above-described processing (S506 and S507) is executed by the controller 112, the network interface 101, the connecting unit 102, and the data buffer 105. However, it is possible to apply the processing to plural programs in parallel using the connecting units 103 and 104 as well in a range in which there is enough room in a network capacity at the time of buffering of contents data.

The controller 112 judges ranks for all programs in the contents list, and displays the ranks at the contents list (S510).

The user confirms the contents list displayed on the display and a rank of easiness of connection, and selects a desired program through manipulation of a remote controller. After a program is selected by manipulation input by the user, the streaming television receiver 100 starts connection for the selected program (S505), starts decode and display of the contents when a buffer amount of the contents data has reached a decodable amount (S512), and continues decode and buffering until the end of the program (S511).

In this way, according to this embodiment, in selecting a program from a contents list, which is a list of selectable programs, a user can learn a necessary period from selection of the program until start of audio visual enjoying before actually selecting the program according to a rank of easiness of connection to be displayed in the contents list.

Thus, the user selects a program while taking into account the rank of easiness of connection, whereby a waiting time, which was unknown until connection was actually performed in the past, becomes clear, uneasiness in that it is unclear how long the user would be kept waiting is eliminated, and stress of the user in manipulation is reduced. In addition, the user does not select a program, to which the user finds it impossible to make connection only when the user actually tries to make connection, and can perform efficient selection manipulation.

Note that, in this embodiment, a necessary period from selection of a program until start of audio visual enjoying is indicated by signs as four levels according to easiness of connection. However, the present invention is not limited to this, and indication according to patterns, colors, or animations representing levels is possible. In addition, the levels are not limited to four but may be separated into more number of levels for indication. Further, it is also possible to represent the levels according to numerical values such as indicating a necessary period for connection directly with numerical values. For example, it is possible to represent the necessary period for connection according to twelve positions of a needle in an illustration imitating a clock and superimpose an illustration of "X" for a program to which connection cannot be made. The levels may be mapped to a color or a size for indication.

In addition, measurement of a necessary period for connection is described as being performed at the time of startup of a streaming television receiver. However, it is possible to measure the necessary period again after elapse of an appropriate time to display a rank, or to repeatedly measure the necessary period every appropriate time. It is also possible to, in the case in which a user continues audio visual enjoying of a program in earnest after manipulation for selection of the program ends, change the display layout shown in FIG. 3 to a layout for displaying an audio visual program in an entire display area of a display. In such case, it is effective to measure the necessary period for connection again to display the measured result upon displaying a contents list again according to the end of a program or manipulation by the user.

In addition, although not described above for simplification of explanation, connection information and medium information for each program obtained in measuring a necessary period for connection can be stored in a nonvolatile memory or the like together with contents list data. When the streaming television receiving apparatus makes connection to contents of a program to start audio visual enjoying through selection of the program by a user, a part of connection processing can be omitted by using the stored connection information.

That is, in S505 of FIG. 5, the streaming television receiver uses connection information of contents obtained and stored in S506 or S508, whereby the steps of 305 and 306 in FIG. 2 can be omitted. Consequently, it is possible to reduce a necessary period for connection of a program and improve convenience of selection of a program and audio visual enjoying manipulation by a user.

Second Embodiment

In a second embodiment, the controller in the streaming receiver in the first embodiment has a different structure, and more advanced convenience is given to selection of a program and manipulation to start audio visual enjoying by a user according to a display method in which a contents list is different depending upon a necessary period for connection. Hereinafter, differences between the first embodiment and the second embodiment will be mainly described. Components which are the same or perform the same operation as those in the first embodiment are denoted by the identical reference numerals, and detailed description of the components will be omitted.

Figure 6:
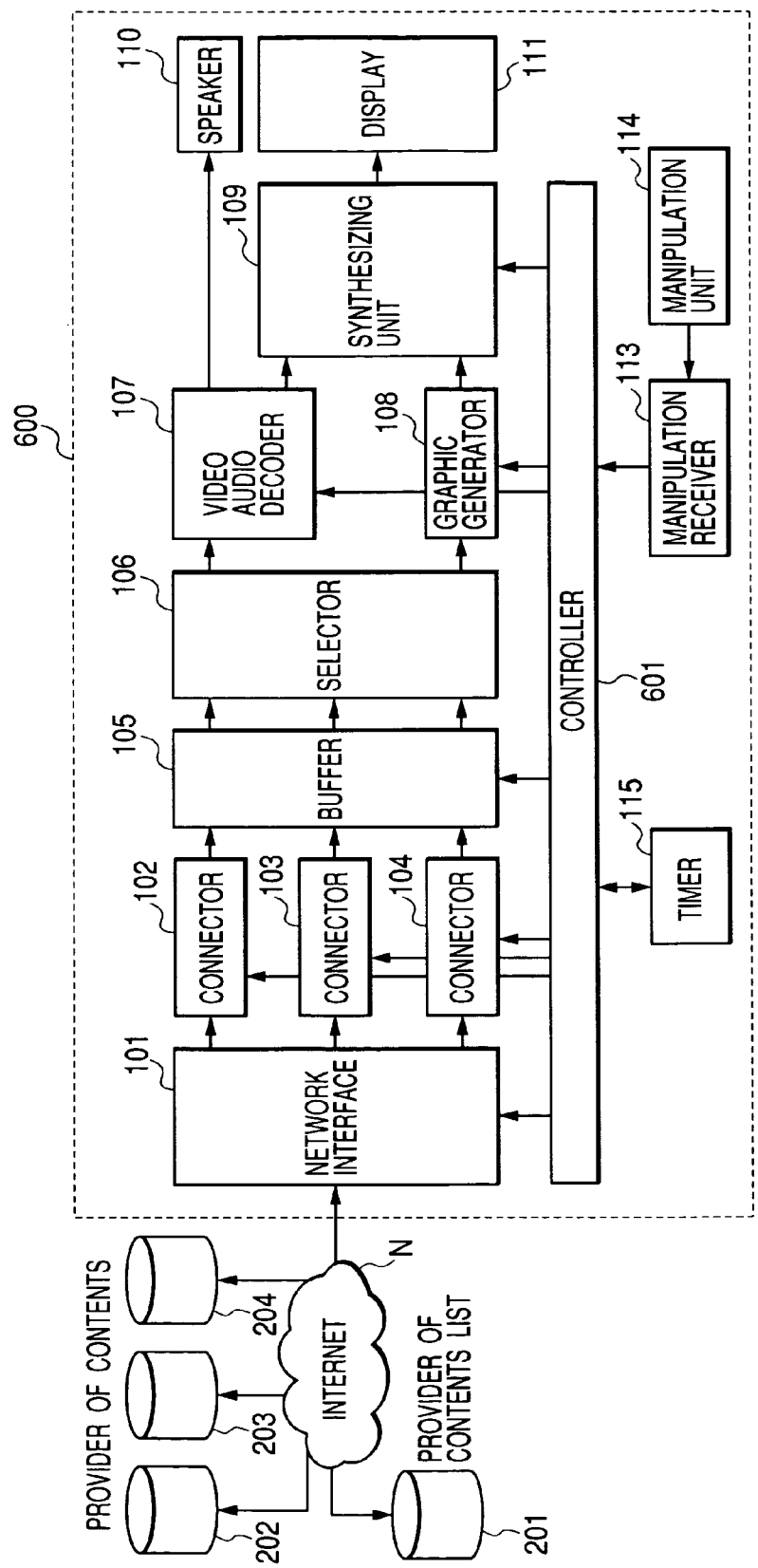
FIG. 6 is a diagram showing a structure of a streaming audio visual system in a second embodiment of the present invention.

FIG. 6 is a diagram showing a structure of a streaming television audio visual system to which the present invention is applied. In the figure, reference numeral 600 denotes a streaming television receiver which is connected to the provider of contents list 201, which offers a service of providing a contents list including information on introduction of an audio visual program and a connection destination, and the providers of contents 202, 203, and 204, which offer a service of providing an audio visual program, via a network such as the Internet N. Reference numeral 601 denotes a controller of the streaming television receiver 600. The controller 601 has a structure for collectively controlling components constituting the streaming television receiver 600 and offering a service having characteristics different from those in the first embodiment to a user.

Figure 7B:
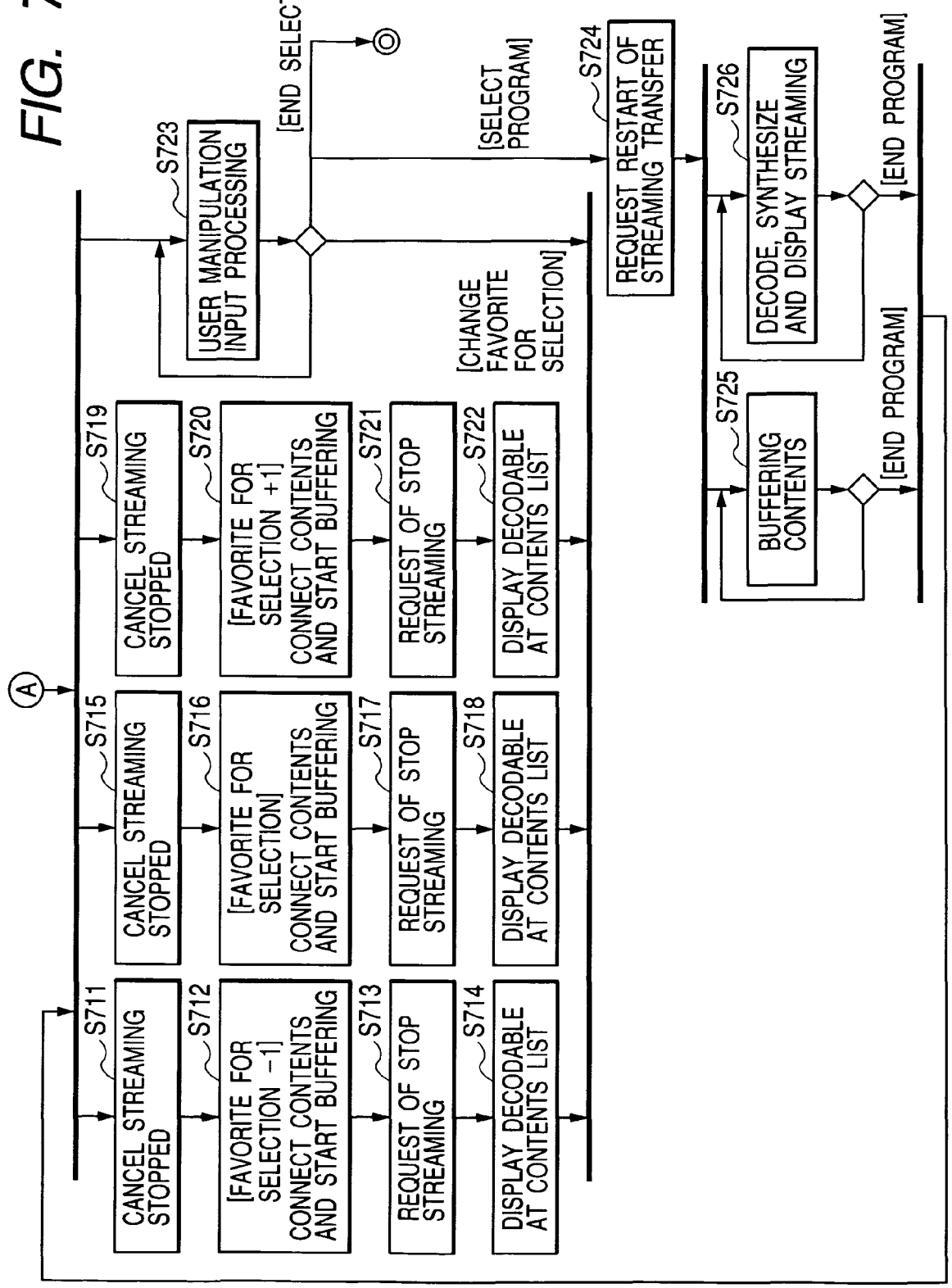
FIG. 7 is comprised of FIGS. 7A and 7B are diagrams showing control of the streaming television receiver.

FIGS. 7A and 7B show a procedure for control of the controller 601 and is an activity diagram showing operations of the streaming television receiver 600. The figure shows control in which the streaming television receiver 600 is started up to display a contents list to be described later, and a user selects a program to audio visually enjoy a streaming program.

Upon being started up, the streaming television receiver 600 performs necessary initialization first (S701), and obtains a contents list data from the provider of contents list 201 (S702). This is equivalent to 305 and 306 in the illustration of FIG. 2 in the first embodiment. Concerning each program in the contents list, the streaming television receiver 600 measures, according to the obtained contents data, a necessary period from program selection of a program until start of audio visual enjoying of the program and stores the measured result as an additional data of the contents list data.

That is, the streaming television receiver 600 selects programs in the contents list one by one, obtains connection information of contents (305 and 306 in FIG. 2), obtains medium information (307 and 308 in FIG. 2), and measures a necessary period T1 (S703). At this time, in the case in which any of these accesses cannot be performed, the streaming television receiver 600 judges that audio visual enjoying of the program is impossible. Next, the streaming television receiver 600 requests starting stream based upon the obtained medium information and starts buffering (equivalent to 309, 310, and 311 in FIG. 2). The streaming television receiver 600 measures a necessary period T2 until the amount of buffer storage reaches a capacity allowing start of decode while monitoring an amount of buffer storage of the contents data (S704), and requests streaming stop of the contents. The streaming television receiver 600 assumes a sum of the measured periods T1 and T2 as a necessary period until start of reception, and adds the obtained data to the contents list data.

In addition, the streaming television receiver 600 compares the period T2 with respect to contents of the received contents data, judges whether or not a sufficient transfer rate is obtained for continuous processing of the contents data, and judges that the audio visual enjoying of the program is impossible if a transfer rate is not sufficient. Then, the judgement data is added to the contents list data.

The above-described processing (S703 and S704) is executed by the controller 601, the network interface 101, the connecting unit 102, and the data buffer 105. However, it is possible to apply the processing to plural programs in parallel using simultaneously the connecting units 103 and 104 as long as there are enough rooms in a network capacity at the time of buffering of contents list data.

Next, the streaming television receiver 600 analyzes the contents list data and displays it on a display as a list of programs. In this case, the streaming television receiver 600 sorts the programs in order from one which is short in the necessary period for connection measured earlier S709), and displays the resultant list (S710).

Figure 8:
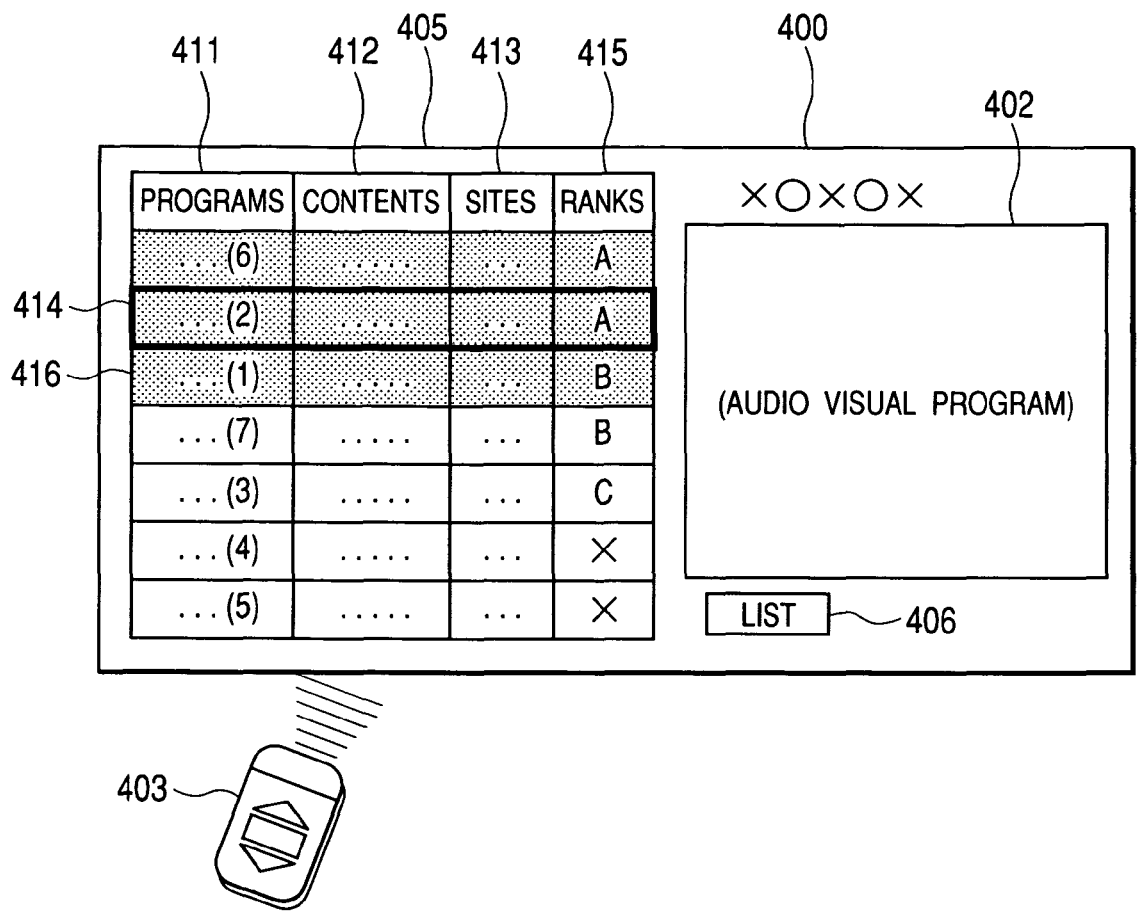
FIG. 8 is a diagram showing a display screen of the streaming television receiver.

FIG. 8 is a diagram showing a display example of the streaming television receiver according to this embodiment. In the figure, reference numeral 405 denotes a contents list in which contents are sorted in accordance with a necessary period for connection and displayed. In FIG. 8, ranks 415 indicating easiness of connection as described in the first embodiment are also displayed. As it is evident from the ranks, in the contents list 405, programs are displayed in order from one which is short in a necessary period from selection of a program until start of audio visual enjoying of the program. The indication of favorite for selection 414 showing favorites for selection of a program is displayed on the contents list, a user can determine a program which the user will audio visually enjoy by using the remote controller 403 to move this indication up and down, and performs determination manipulation of the remote controller 403 in a state in which the indication of favorite for selection 414 is on a target program. Control for audio visual enjoying is started simultaneously with the determination of a program, video data is displayed in the audio visual program display section 402, and the user can audio visually enjoy the program as described in the first embodiment.

Moreover, in the contents list 405, when a program is selected, a program for which audio visual enjoying can be immediately started is indicated in a manner different from that for other programs. Here, this indication 416, which is called "indication of immediately viewable program" as a simple name, is displayed for a program having a favorite for selection, and a program having a second highest likelihood of being selected. The indication is displayed at a point when it becomes possible to immediately start audio visual enjoying after the selection according to control which is performed in parallel with processing of a user manipulation input by the controller 601.

Returning to FIGS. 7A and 7B, control of the controller 601 will be described. In parallel with displaying a contents list and starting manipulation input processing by the user (S723), the controller 601 controls the connecting unit 102, the network interface 101, and the data buffer 105 with respect to contents including indication of favorite for selection, which the user is expected to start audio visual enjoying next, and starts connection and buffering of the contents data (S716).

Then, the controller 601 requests the providers of contents 202 to 204 to streaming stop at a point when an amount of data buffer has reached an amount allowing decode to be started. At this point, the controller 601 stores a time stamp of contents data to be stopped in an inside memory. Next, the controller 601 indicates, as the "indication of immediately viewable program", that the amount of data buffer has reached the amount allowing decode to be started and it has become possible to immediately start audio visual enjoying after selection of a program (S718).

The controller 601 uses the connecting units 103 and 104 to apply the same control to programs listed above and below the program including the indication of favorite for selection on the contents list, and shows the "indication of immediately viewable program" at a point when it has become possible to immediately start audio visual enjoying of the respective programs (S712 to S714 and S720 to S722).

In the case in which the indication of favorite for selection 414 is moved by manipulation by the user, the controller 601 applies the same control to three new programs. However, the controller 601 continues the control for two programs whose data is stored in the buffer memory 105, cancels streaming of a stopped state for a program excluded from targets of the control (S711, S715, or S719), and starts new connection and buffering.

Figure 9:
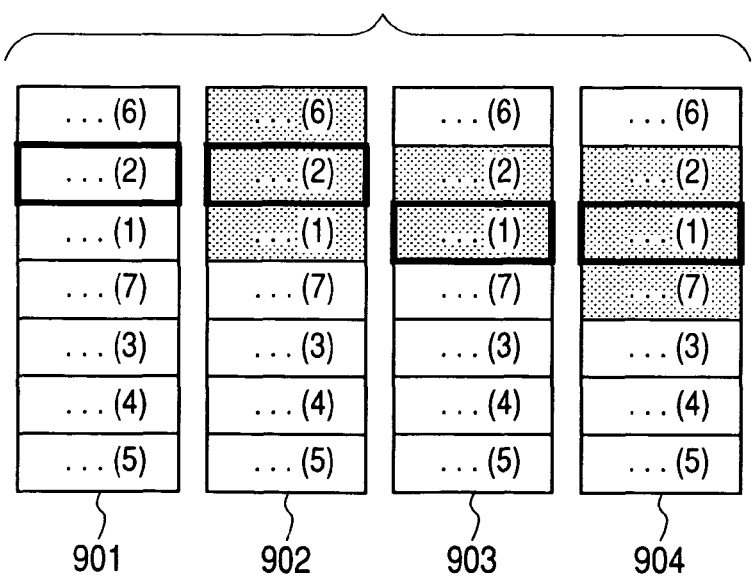
FIG. 9 is a diagram schematically showing a change in control on the display screen of the streaming television receiver.

FIG. 9 schematically shows changes in the indication of favorite for selection and the "indication of immediately viewable program" in this control. That is, the "indication of immediately viewable program" is not shown immediately after the contents list is displayed and in a state in which speculative connection and buffering are not performed for any program (901). In a state in which the indication of favorite for selection 414 is on a program (2), connection and buffering are started for programs (1), (6), and (2), and the "indication of immediately viewable program" is shown from a program, for which buffering is completed, in order (902). Here, since this control is started almost simultaneously for the three programs, the "indication of immediately viewable program" is shown in the order of shortness of a necessary period for connection, that is, in the order of the programs (6), (2), and (1).

When the indication of favorite for selection 414 is moved to the program (1) by manipulation by the user, connection of the programs (2) and (1) is continued, and connection and buffering of a program (7) is started anew. In this embodiment, since more than three programs cannot be connected simultaneously, in order to connect the program (7) anew, the connection of the program (6) is cancelled, and the "indication of immediately viewable program" for the program (6) is also cancelled (903). At a point when the buffering for the program (7) connected anew is completed, the "indication of immediately viewable program" for the program (7) is shown (904).

Returning to the activity diagram of FIGS. 7A and 7B, control after a program is selected will be described. In the case in which a program including the indication of favorite for selection 414 is selected by manipulation by the user, the controller 601 sends a request to start streaming to a provider of contents of the selected program together with the saved time stamp (S724). Then, the controller 601 starts decode, synthesizing, and display of the contents data already stored in the buffer memory 105 (S726) and also starts buffering of the sent stream data from the part where connection was stopped to continue the buffering of the contents data until the end of the program (S725).

The above description is on the assumption that stream data of a program to be audio visually enjoyed is located in a provider of contents, and audio visual enjoying of the program is started according to a request of an audience. However, in the case of a program such as a real-time relay broadcast, a part of control is changed. Even if streaming transmission of contents is requested to be stopped for such a program, the provider of contents does not accept the request. In addition, contents data for which audio visual enjoying should be started is required to be always latest data.

Figure 10:
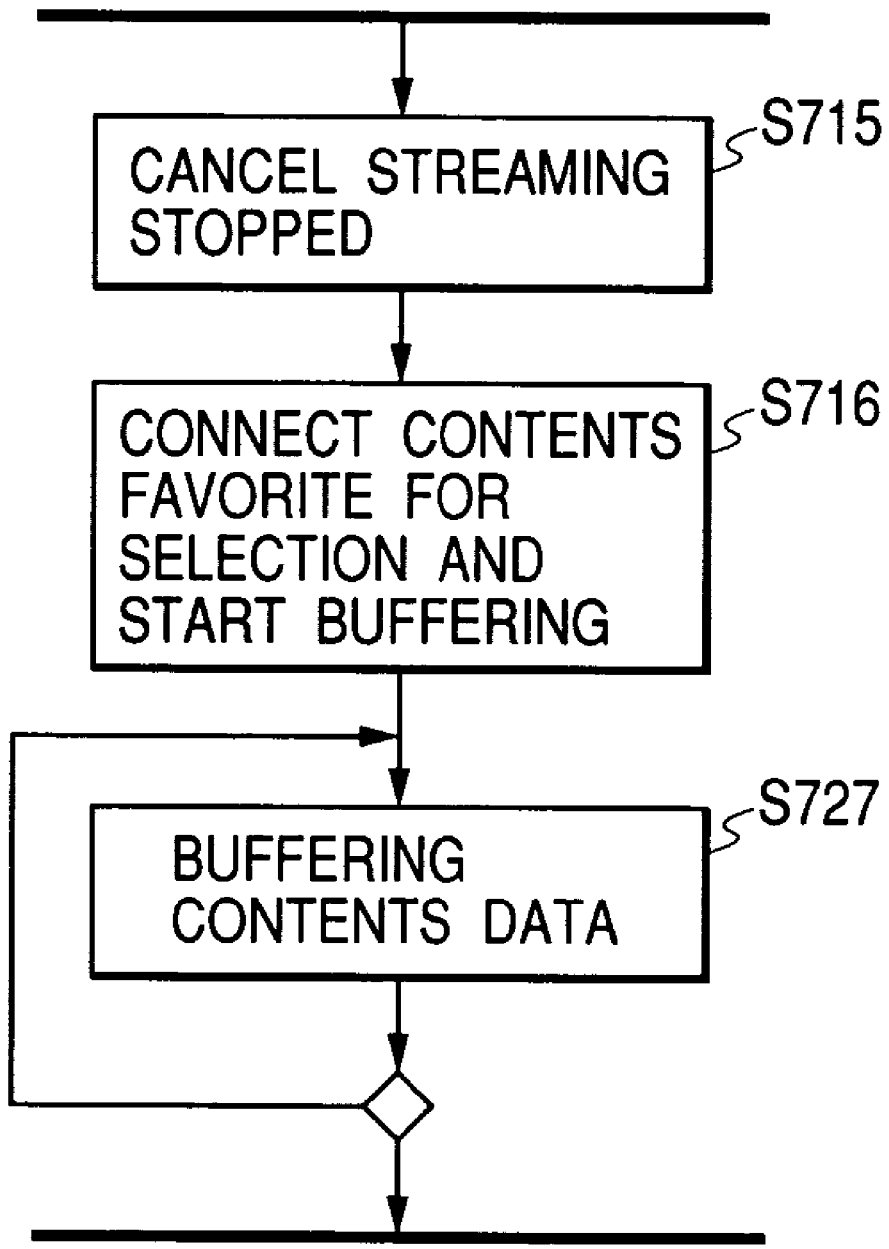
FIG. 10 is a diagram showing a main part concerning a different structure for control of the streaming television receiver.

FIG. 10 is a diagram showing a part of FIGS. 7A and 7B which should be changed for control for the above case. The controller 601 of the streaming television receiver 600 performs connection and buffering of contents favorite for selection (S716) and, when an amount of buffer has reached a decodable amount, continues buffering of contents data without requesting stop of streaming (S727). At this point, the controller 601 performs control to cancel data stored earlier in order such that latest data is always stored in a data buffer. Such control is applied to the other two targets of control depending on contents in the same manner.

In the above description, concerning a method of displaying the "indication of immediately viewable program", a background color of a column of a pertinent program in the contents list is illustrated as changing. However, the display method is not limited to this as long as it can be indicated to a user that audio visual enjoying of a program can be started immediately after the program is selected, and indication by signs or figures, blinking change of a display color, change of a font, highlighted indication of characters, or the like may be adopted.

In addition, in this embodiment, the above description is on the assumption that the number of connecting units provided in a receiver is three and the number of stream contents simultaneously connectable is three. However, it is also possible to implement a connecting unit in terms of software and control and execute a data buffer so as to dynamically secure an area of a storage unit to thereby constitute a streaming television receiver so as to connect more than three stream contents. Further, it is also possible to dynamically control the number of stream contents.

According to this embodiment, a contents list in which contents are sorted in an order of shortness of a necessary period for connection is presented to a user, whereby a program which has a short waiting time and is therefore easily selected is displayed preferentially, and selection of a program for comfortable manipulation of audio visual enjoying is facilitated.

In addition, since a predetermined amount of streaming contents data is received and stored in a buffer memory in advance for a program to be selected, audio visual enjoying can be started for a program, for which buffering has been completed, without a waiting time. Further, since it is indicated that buffering has been completed and audio visual enjoying can be started immediately, for example, in the case of a method of use for determining a final audio visual program while briefly looking at contents of programs such as zapping, a user can adjust a length of audio visual enjoying on trial while looking at a display to adjust timing for switching. Moreover, according to such adjustment manipulation, it becomes possible to provide a manipulation environment with less psychological stress on the user even in switching to a program with a long necessary period for connection.

Third Embodiment

In a third embodiment, a television broadcast receiving function is added to the streaming television receiver in the first or second embodiment. In the third embodiment, differences between the first and second embodiments and the second embodiment will be hereinafter mainly described.

Components which are the same or perform the same operation as those in the first and second embodiments are denoted by the identical reference numerals, and detailed description of the components will be omitted.

Figure 11:
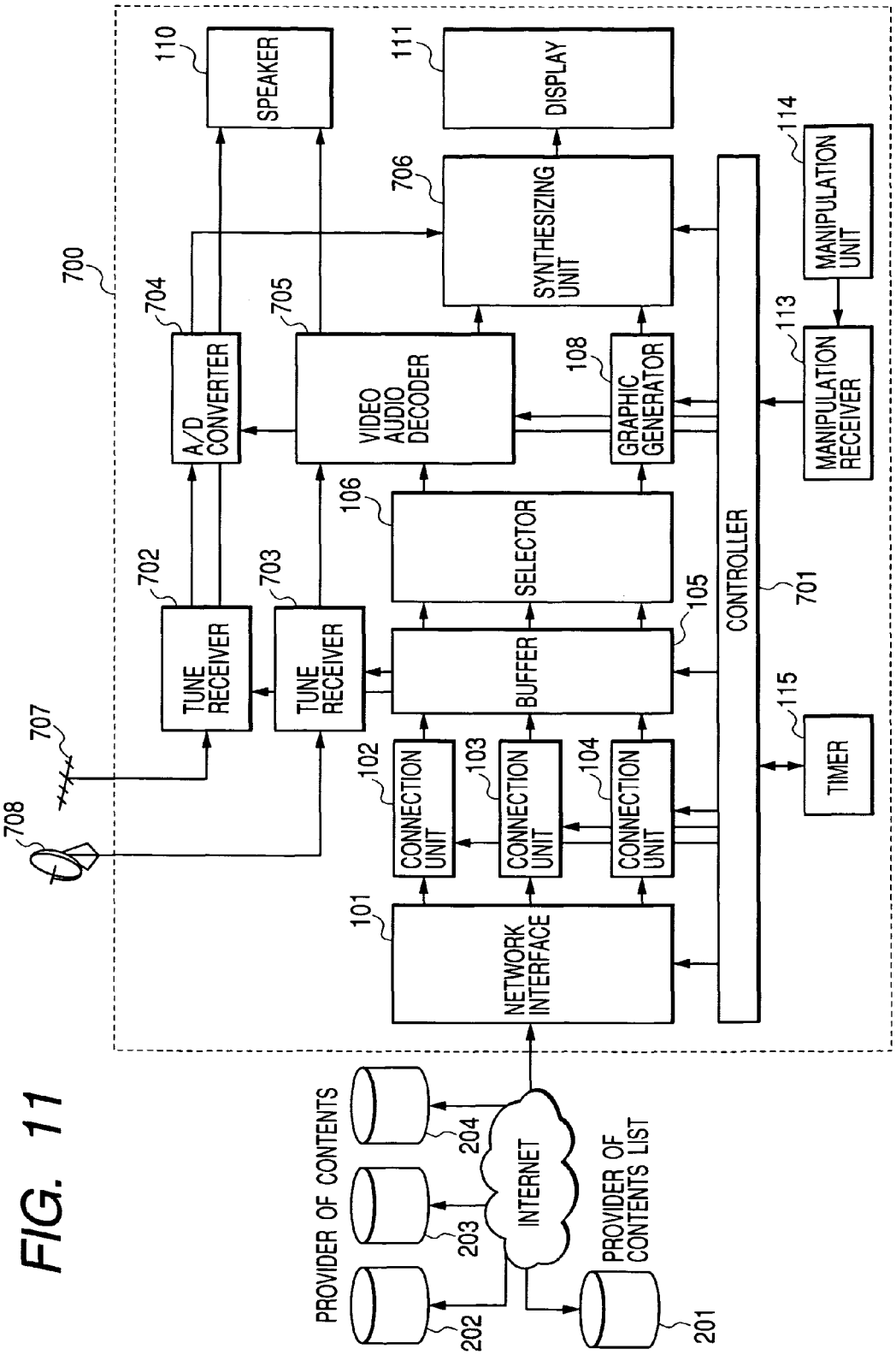
FIG. 11 is a diagram showing a structure of a streaming audio visual system in a third embodiment of the present invention.

FIG. 11 is a diagram showing a structure of a streaming television audio visual system to which the present invention is applied. In the figure, reference numeral 700 denotes a streaming television receiver which is connected to the provider of contents list 201, which offers a service of providing a contents list including information on introduction of an audio visual program and a connection destination, and the providers of contents 202, 203, and 204, which offer a service of providing an audio visual program, via a network such as the Internet N.

Reference numeral 702 denotes tune receiver for performing reception and tuning to channels of a ground wave television broadcast, which receives a television broadcast program under control of the controller 701. An analog video signal to be outputted is sent to a synthesizing unit 706 via A/D converter 704, synthesized with a video signal according to the digital satellite broadcast, or video data and graphic data according to a streaming program, and displayed on the display 111. Reference numeral 707 denotes an antenna which receives an analog television broadcast wave and is connected to the receiver selecting channels 702.

Reference numeral 703 denotes receiver selecting channels for performing reception and channel selection of a digital satellite broadcast, which receives a digital television broadcast program under control of the controller 701. A transport stream signal to be outputted is sent to a video/audio decoder 705 including a demultiplexer function, and a decoded audio signal is outputted through a speaker 110. In addition, a decoded video signal is sent to the synthesizing unit 706, synthesized with a video signal according to the analog television broadcast, or video data and graphic data according to a streaming program, and displayed on the display 111. Reference numeral 708 denotes an antenna which receives a digital satellite broadcast wave and is connected to the receiver selecting channels 703.

Reference numeral 701 denotes a controller of the streaming television receiver, which collectively controls components constituting the streaming television receiver 700, applies control described in the first and second embodiments to a streaming program, and controls selection and reception of a program, display of video data, and output of audio data with respect to a broadcast program on an analog ground wave television broadcast and a digital satellite broadcast.

In the streaming television receiver 700 constituted as described above, it becomes possible to display programs of a ground wave analog broadcast and a satellite digital broadcast in the contents list described in the first and second embodiments and allow a user to select a program without distinguishing those programs from streaming programs.

The user can select a program according to only an interest in the program regardless of a medium to which the program is applied. In this case, programs can be switched in a state in which a selection time is virtually unnecessary, in particular, in a necessary period for selection of a streaming program which depends upon a situation of a contents provider site or a network as described in the second embodiment. This is a significant advantage in audio visual enjoying a streaming program without distinguishing it from programs on the ground wave analog broadcast and the satellite digital broadcast.

In this embodiment, the structure of the streaming television receiver 700 is described as incorporating the display 111. However, it is also possible to constitute the streaming television receiver 700 so as not to include a display but to have an external connecting unit, and cause a display apparatus, which is externally connected to the streaming television receiver 700, to display an output of the synthesizing unit 706 via this external connecting unit. Such a structure is also applicable in the first and second embodiments. In addition, in the present invention, contents to be received are not necessarily a program but may be an image such as an icon.

As described above in detail, a time required for reception of contents data is estimated from a data transfer rate or the like, whereby a user can learn a necessary period from selection of contents until start of audio visual enjoying before actually selecting contents such as a program.

What is claimed is:

1. A receiving apparatus comprising:
   a reception unit constructed to receive content data and content list data via a network, wherein the content list data comprises information including a content name for specifying each of a plurality of receivable contents data on the receiving apparatus;
   a content processing unit constructed to process the content data received by the reception unit to generate video data and audio data;
   a generating unit constructed to generate a content list based on the content list data received by the reception unit, for displaying the content name of each of the plurality of receivable contents data in a list format;
   an output unit constructed to output the content list generated by the generating unit and the video data and audio data to a display apparatus; and
   a control unit constructed to generate rank information based on an estimated time period from a selection of the content in the content list by a user until the content is reproducible,
   wherein the estimated time period is determined automatically after the receiving apparatus starts up and before the receiving apparatus starts reception of a manipulation for selection by the user, and provides an estimate of the time period from a selection of the content in the content list by a user until the content is reproducible,
   wherein the generating unit generates the content list including the rank information of each content data and the content name of each content data, and the display apparatus displays the content list including the rank information automatically after the receiving apparatus starts up and before the receiving apparatus starts reception of a manipulation for selection by the user.

2. A receiving apparatus according to claim 1, wherein the control unit judges that reception is impossible in the case in which a time required for a procedure for receiving a predetermined amount of the content data has exceeded a predetermined time, and the generating unit generates the content list including information indicating that the reception is impossible.

3. A receiving apparatus according to claim 1, wherein the reception unit is constructed for reception of N pieces of the content data in parallel with each other, and the control unit detects the time for the N pieces of the content data in parallel with each other, which are received by the reception unit in parallel with each other among the plural content data.

4. A receiving apparatus according to claim 3, wherein the reception unit has a storage unit which is constructed for storage of a predetermined amount of the N pieces of the content data, respectively, and the control unit controls the reception unit so as to store the predetermined N pieces of the content data among the plural content data in the storage unit.

5. A receiving method performed by a receiving apparatus, comprising the steps of:

receiving content data and content list data via a network, wherein the content list data comprises information including a content name for specifying each of a plurality of receivable contents data on the receiving apparatus;

processing the content data received by the receiving step, to generate video data and audio data;

generating a content list, based on the content list data received in the receiving step, for displaying the content name of each of the plurality of receivable contents data in a list format;

outputting the generated content list and the video data and audio data to a display apparatus; and controlling to generate rank information based on an estimated time period from a selection of the content in the content list by a user until the content is reproducible, wherein the estimated time period is determined automatically after the receiving apparatus starts up and before the receiving apparatus starts reception of a manipulation for selection by the user, and provides an estimate of the time period from a selection of the content in the content list by a user until the content is reproducible, wherein, the generating step generates the content list including the rank information of each content data and the content name of each content data, and the content list including the rank information is displayed the display apparatus automatically after the receiving apparatus starts up and before the receiving apparatus starts reception of a manipulation for selection by the user.

6. A receiving method according to claim 5, wherein, in the control step, it is judged that reception is impossible in the case in which a time required for a procedure for receiving a predetermined amount of the content data has exceeded a predetermined time, and in the generating step, the content list is generated to include information indicating that the reception is impossible.

7. A receiving method according to claim 5, wherein the receiving step receives N pieces of the content data in parallel with each other, and the control step detects the time for the N pieces of the content data in parallel with each other, which are received in the receiving step in parallel with each other among the plural content data.

8. A receiving method according to claim 7, wherein the receiving step comprises a storage step which stores a predetermined amount of the N pieces of the content data, respectively, and, in the control step, it is controlled to store the predetermined N pieces of the content data among the plural content data in a storage unit.

9. A receiving apparatus according to claim 1, wherein the control unit measures a first time period from the selecting of each of a plurality of contents data to be received until a start of actually receiving the selected content data, and a second time period until meeting a capacity capable of starting to decode of the received content data, and generates the rank information of each of the contents included in the content list based on a total time of the first and second time periods and a transmission rate of the content data.

10. A receiving method according to claim 5, wherein in said step of controlling, a first time period is measured from the selecting of each of a plurality of contents data to be received until a start of actually receiving the selected content data, and a second time period is measured until meeting a capacity capable of starting to decode of the received content data, and wherein the rank information of each of the contents included in the content list is generated based on a total time of the first and second time periods and a transmission rate of the content data.

* * * * *